June 17, 1969     D. W. WENDT ET AL     3,450,430
CAB AND ROLL BAR
Filed March 8, 1968
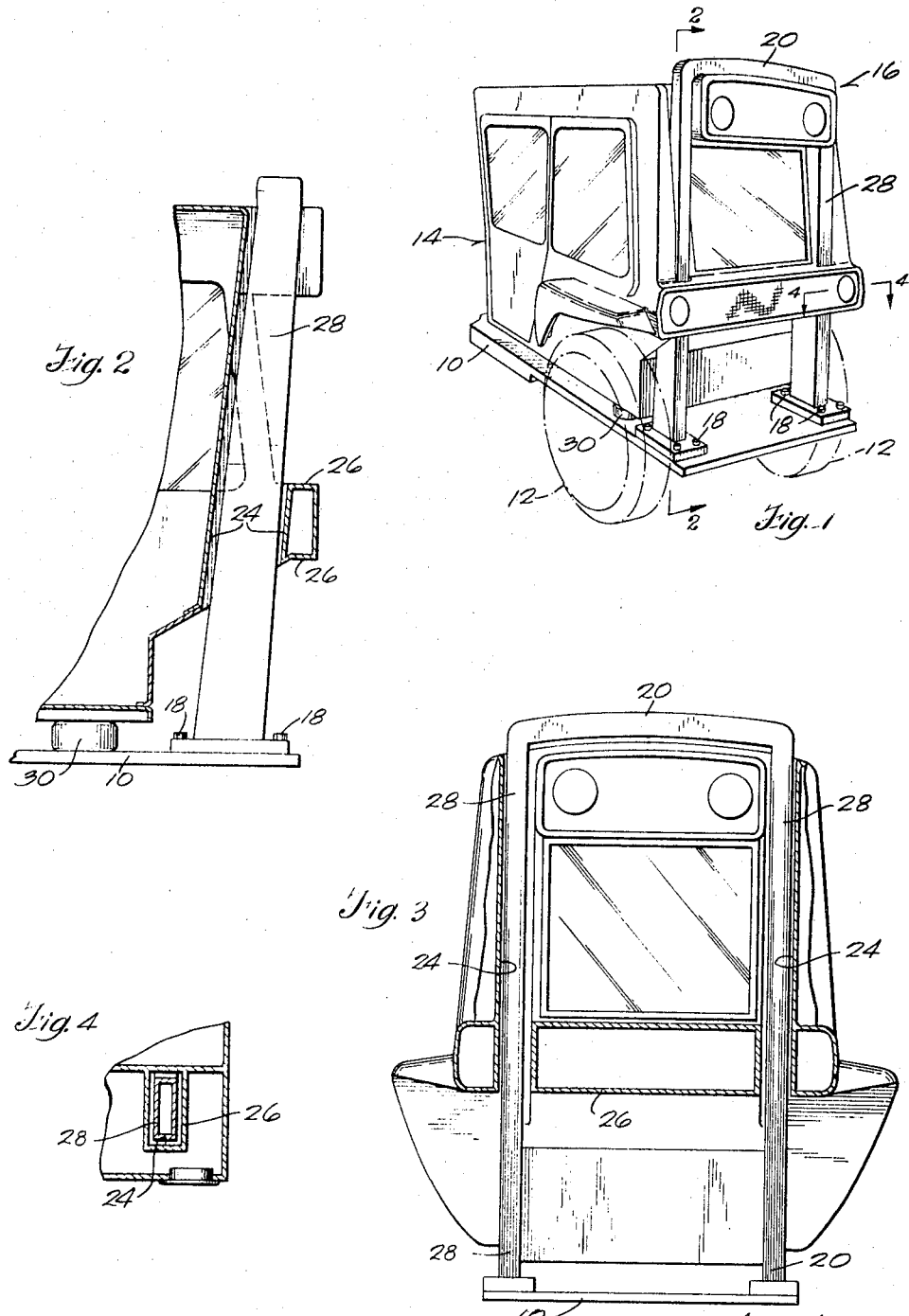
Inventors
David W. Wendt
Charles L. Harbeck
Raymond N. Sellon Jr.
By
Wheeler, Wheeler, House & Clemency
Attorneys United States Patent Office 3,450,430
Patented June 17, 1969

3,450,430
CAB AND ROLL BAR
David W. Wendt, Port Washington, Charles L. Harbeck, Pewaukee, and Raymond N. Sellon, Jr., Shorewood, Wis., assignors to Stolper Industries, Inc., Menomonee Falls, Wis.
Filed Mar. 8, 1968, Ser. No. 711,757
Int. Cl. B62d 27/02, 29/00; B60r 27/00
U.S. Cl. 296—28                                    6 Claims

ABSTRACT OF THE DISCLOSURE

An automotive vehicle has a roll bar secured to the main frame of the vehicle and disposed in channel in the wall of the cab where it is at least partially housed but is free of vibration-transmitting contact with the cab.

Background of the invention

In automotive vehicles such as industrial and agricultural vehicles, roll bars have been extensively adopted to protect the operator in the event the vehicle should roll over. These roll bars extend upward over the top of the console or cab for the operator and are made of a relatively heavy construction in order to protect the operator. The roll bar for the most part has been integrated into the cab construction, forming a part of the wall structure of the cab. The roll bar is made of a fairly heavy material and is unsupported at its upper end. Vibrations in the frame are transferred to the roll bar and are to some extent amplified at the upper end of the bar. Since the roll bar is made integral with the supporting structure of the cab, the vibrations of the upper end of the roll bar will be transferred directly to the cab.

Summary of the invention

In the present invention a roll bar is provided for the cab of an automotive vehicle and so disposed as to be isolated from the cab to provide a relatively vibration-free ride for the operator of the vehicle. The roll bar is secured to the frame of the vehicle and has leg portions which extend upward free of connection with the cab but through upright channels or grooves formed within the cab body. If it is considered desirable, the cab may be further isolated from the frame by mounting the cab on vibration damping means or cushions such as separate support bushings. The roll bar will still provide the protection required for the operator of the vehicle in the event of an accident. If it vibrates the vibrations will not be transferred to the cab wall. Thus the operator will be isolated from the vibrations induced in the roll bar. By positioning the roll bar within a channel in the cab of the vehicle, the overall appearance of the cab will be maintained.

Other objects and advantages will be apparent from the following detailed description when read in connection with the accompanying drawings in which:

FIG. 1 is a perspective view of the front of an automotive vehicle having the improved roll bar construction.

FIG. 2 is taken on line 2—2 of FIG. 1 showing the location of the roll bar within the cab.

FIG. 3 is a front section view of FIG. 1 showing the roll bar in the channel provided around the cab.

FIG. 4 is a view taken on line 4—4 of FIG. 1 to show the relationship of the roll bar to the cab of the vehicle.

Description of the preferred embodiment

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1 of the drawing, the automotive vehicle in which the present invention has been incorporated includes a main frame 10 supported by wheels 12 (two of which are diagrammatically illustrated) with a cab 14 for the operator of the vehicle supported on the frame. A roll bar 16 is secured to the frame 10 by an appropriate means such as bolts 18 independent of the cab connection with the legs 28 of the roll bar projecting upward. The legs 28 are connected at the top by a cross bar 20 extending across the top of the cab. The roll bar 16 is preferably mounted on the frame 10 rather than on the axle.

Referring to FIGS. 2 and 3, it will be noted that the cab includes an internal channel or groove 24 in the walls 26 of the cab. The legs 28 of the roll bar are positioned in the channels 24 in the cab in spaced relation thereto so that the vibrations of the roll bar will not be transferred to the cab. In FIG. 4 the channel 24 is shown wholly enclosed and the leg 20 is shown within and spaced from the walls of the enclosed channel. In all views the legs are partially enclosed or embraced by wall portions of the cab, despite the fact that the bar is external so far as the passenger space is concerned.

If it is desired further to isolate the cab 14 from the vibrations of the main frame, rubber mounting bushings 30 may be positioned as a cushion between the cab and the frame. Any other type cushion may also be used.

What is claimed is:

1. An automotive vehicle comprising a frame supported for movement over the ground, a cab mounted on the frame and provided with wall portions having upright channels at opposite sides of the frame, a roll bar secured to the frame and positioned in the channels of the cab wall, free of contact with the wall, the cab and roll bar having mutually independent mounting connections.

2. An automotive vehicle according to claim 1 wherein said cab is mounted on vibration damping bushings on the frame.

3. An automotive vehicle comprising a frame supported for movement over the ground, an upright roll bar secured to the frame, and a cab mounted on the frame in spaced relation to the roll bar and having channel portions embracing the roll bar and free of contact therewith, the cab having passenger space to which the roll bar is external.

4. An automotive vehicle according to claim 3 wherein said roll bar having leg portions positioned within said channel portions.

5. A vehicle according to claim 4 in which said cab portions are closed about said bar leg portions.

6. An automotive vehicle according to claim 4 including vibration damping means between the cab and the frame.

References Cited

UNITED STATES PATENTS

| | | | |
|---|---|---|---|
| 2,358,663 | 9/1944 | Scott-Iversen | 293—63 |
| 2,967,072 | 1/1961 | Wilfert, et al. | 296—28 |
| 3,024,060 | 3/1962 | Barenyi | 296—28 |

LEO FRIAGLIA, Primary Examiner.

J. A. PEKAR, Assistant Examiner.

U.S. Cl. X.R.

280—150